United States Patent
Uchiyama et al.

(10) Patent No.: US 6,905,321 B2
(45) Date of Patent: Jun. 14, 2005

(54) ROTARY PUMP FOR BRAKING APPARATUS

(75) Inventors: Kazunori Uchiyama, Nishio (JP);
Naoki Hakamada, Anjo (JP); Takahiro Yamaguchi, Kariya (JP); Takashi Satou, Okazaki (JP)

(73) Assignees: Advics Co., Ltd., Aichi-pref. (JP);
Nippon Soken Inc., Aichi-pref. (JP)

( * ) Notice: Subject to any disclaimer, the term of this patent is extended or adjusted under 35 U.S.C. 154(b) by 0 days.

(21) Appl. No.: 10/453,623

(22) Filed: Jun. 4, 2003

(65) Prior Publication Data
US 2003/0227216 A1 Dec. 11, 2003

(30) Foreign Application Priority Data
Jun. 6, 2002 (JP) ........................................ 2002-165871

(51) Int. Cl.[7] .............................................. F04C 18/00
(52) U.S. Cl. ............................ 418/171; 418/75; 418/79; 418/102; 418/132
(58) Field of Search ............................ 418/75, 79, 102, 418/132, 166, 171

(56) References Cited

U.S. PATENT DOCUMENTS

| 2,968,251 A | * | 1/1961 | Eames, Jr. et al. | 418/171 |
| 3,188,969 A | * | 6/1965 | Brundage | 418/171 |
| 3,198,127 A | * | 8/1965 | Brundage | 418/171 |
| 5,466,137 A | * | 11/1995 | Bierlein et al. | 418/171 |

FOREIGN PATENT DOCUMENTS

| JP | 63-131877 | * | 6/1988 | ................. 418/171 |
| JP | A-2000-179466 | | 6/2000 | |

* cited by examiner

*Primary Examiner*—Theresa Trieu
(74) *Attorney, Agent, or Firm*—Posz Law Group, PLC

(57) ABSTRACT

In a rotary pump for a braking apparatus, a discharge trench is formed on an axial direction end surface of a second side plate that forms a mechanical seal. As a result, rotors are pressed back toward a side of a first side plate by a discharge pressure of brake fluid channeled to the discharge trench. Accordingly, a force pressing the rotors toward the second side plate is reduced and frictional resistance is reduced.

20 Claims, 9 Drawing Sheets

US 6,905,321 B2

ROTARY PUMP FOR BRAKING APPARATUS

CROSS REFERENCE TO RELATED APPLICATION

This application is based upon and claims the benefit of Japanese Patent Application No. 2002-165871 filed on Jun. 6, 2002, the content of which are incorporated herein by reference.

FIELD OF THE INVENTION

The present invention relates to a rotary pump for a braking apparatus that intakes and discharges brake fluid.

BACKGROUND OF THE INVENTION

Conventionally, a rotary pump such as that disclosed in Japanese Patent Publication Laid-Open No. 2000-179466 has been used as an internal gear type rotary pump, such as a trochoid pump. The rotary pump includes an inner rotor having an external tooth portion in its outer periphery, an outer rotor having an internal tooth portion in its inner periphery, and a casing that houses the inner rotor and the outer rotor. The inner rotor and the outer rotor are disposed within the casing such that the internal teeth portion and the external teeth portion mesh with each other and a plurality of chambers are formed between the respective tooth portions.

If a line which passes through central axes of both the inner rotor and the outer rotor is defined as a center line of the pump, an intake port and a discharge port that communicate with the plurality of chambers are provided on either side of the center line. When the pump is driven, the central axis of the inner rotor is set as the drive shaft, and the inner rotor is rotated via the drive shaft. Accompanying the rotation of the inner rotor, the outer rotor is also rotated in the same because the inner tooth portion and the outer tooth portion mesh each other. At this time, the pump intakes brake fluid from the intake port, and discharges brake fluid from the discharge port due to respective volumes of the plurality of chambers becoming larger and smaller during each rotation of the outer rotor and the inner rotor.

Sealing of both end surfaces in an axial direction of the rotary pump is achieved by a resin member made of resin. The resin member functions as a seal by being pushed by an elastic member made from an elastic body such as rubber, or the like.

However, when a sealing manner utilizing such a resin made sealing unit is adopted for both end surfaces in the axial direction, as in the above rotary pump, leads to an increase in cost. Accordingly, it is possible to reduce cost with a structure that adopts the resin made sealing unit at one end surface of the rotary pump, and a mechanical seal in which the inner rotor and the outer rotor are directly pressed against a side plate at the other end surface of the rotary pump.

With above mentioned structure, however, if the mechanical seal is adopted, the inner rotor and the outer rotor, which are both made of metal, are forcefully pressed against the metal made side plate, and thus a problem is caused in which drive torque increases substantially due to friction resistance becoming larger.

Further, since a contact area of the inner rotor or the outer rotor and the side plate is large, a problem occurs in which drive torque increases substantially as a result of shear resistance of brake fluid, particularly when viscosity of the brake fluid becomes high at low temperatures.

SUMMARY OF THE PRESENT INVENTION

In view of the foregoing situation, an object of the present invention is to prevent or inhibit an increase in drive torque in the case that a mechanical seal is adopted.

According to a first aspect of the present invention, in a rotary pump for a braking apparatus, at one of a drive shaft axial direction side of a rotation portion, a gap between end surfaces of an outer rotor and an inner rotor in respective axial directions thereof and an end surface of a first side plate in an axial direction thereof is sealed by a sealing unit provided in a first side plate. Further, at the other drive shaft axial direction side of the rotation portion, a gap between end surfaces of the outer rotor and the inner rotor in the respective axial directions thereof and an end surface of a second side plate in the axial direction thereof is sealed by a mechanical seal resulting from the outer rotor and the inner rotor being pushed against the second side plate by a discharge pressure of brake fluid that acts upon the sealing unit. Moreover, a discharge trench communicating with a discharge port is formed in the axial direction end surface of the second side plate to which the mechanical seal is applied.

Accordingly, the rotors are pressed back toward a side of the first side plate by the discharge pressure of brake fluid transmitted in the discharge trench. Therefore, the force pressing the rotors against the second side plate is decreased, and frictional resistance is reduced. Accordingly, it is possible to prevent or inhibit an increase in drive torque when utilizing the mechanical seal.

According to a second aspect of the present invention, an intake trench communicating with an intake port is formed in the axial direction end surface of the second side plate to which the mechanical seal is applied.

Accordingly, a contact area of the rotors and the second side plate is reduced by an area equivalent to the intake trench. Thus, shear resistance of the brake fluid is reduced. Accordingly, it is possible to prevent or inhibit increase in drive torque when utilizing the mechanical seal.

According to a third aspect of the present invention, an extended trench is formed extending from the discharge trench toward a first portion of the axial direction end surface of the second side plate to which the mechanical seal is applied. The first portion is closer to a side of a central hole than to a first sealed chamber.

A pressing force F1 that presses the rotors back toward the second side plate results from the discharge pressure of the brake fluid that acts upon the sealing unit. A backward-pressing force F2 that presses the rotors toward the first side plate results from a pressure of the brake fluid that has entered at a contact surface of the rotors and the second side plate. Further, an actual pressing force F that is the difference between the pressing force F1 and the backward-pressing force F2 acts on the rotors and actually presses the rotors toward the second side plate.

Further, the pressing force F1 is constant in all areas, whereas the backward-pressing force F2 varies from area to area. According to research conducted by the inventors, it is clear that, at the contact surface of the rotors and the second side plate, the pressure becomes lower at the area that is closer to the side of the central hole than that toward the first sealed chamber. Accordingly, at this low-pressure area, the backward-pressing force F2 becomes smaller and the actual pressing force F becomes larger, and the frictional resistance becomes substantially larger.

In order to address this, according to the third aspect, brake fluid discharge pressure acts on the area of the contact surface of the rotors and the second side plate that is closer to the side of the central hole than the first sealed chamber. Accordingly, the actual pressing force F of this area becomes smaller, and frictional resistance is reduced.

According to a fourth aspect of the present invention, an extended trench is formed extending from the discharge trench toward a second portion of the axial direction end surface of the second side plate to which the mechanical seal is applied. The second portion is closer to the side of the central hole than to a second sealed chamber.

According to research conducted by the applicant, it is clear that, at the contact surface of the rotors and the second side plate, the pressure becomes lower at the second portion that is closer to the side of the central hole than that toward the second sealed chamber. Accordingly, at this low-pressure area, the backward-pressing force F2 becomes smaller, the actual pressing force F becomes larger, and thus the frictional resistance becomes substantially larger.

In order to address this, according to the fourth aspect, brake fluid discharge pressure acts on the area of the contact surface of the rotors and the second side plate that is closer to the side of the central hole than the second sealed chamber. Accordingly, the actual pressing force F of this area becomes smaller, and frictional resistance is reduced.

Further, a sealing trench portion may be formed in the first side plate so as to pass between the discharge port and the drive shaft, pass around the first and the second sealed chambers and extend as far as an outer periphery of the outer rotor. Moreover, the sealing unit may be disposed within the sealing trench portion, and an outer periphery side profile of the intake trench may have the same shape as and overlap with an inner periphery side profile of the sealing trench portion, when viewed from the axial direction of the drive shaft.

According to a fifth aspect of the present invention, a sealing trench portion is provided in the first side plate and passes between the discharge port and the drive shaft, passes through the first and the second sealed chambers and extends as far as an outer periphery of the outer rotor. Further, the sealing unit is disposed within the sealing trench portion. In addition, at an area closer to a side of the central hole than the first sealed chamber, an outer periphery side profile of the intake trench is located at a position further to an inside than an inner periphery side profile of the sealing trench portion, when the intake trench and the sealing trench portion are viewed from the axial direction of the drive shaft.

In a similar manner to previously described, on the contact surface of the rotors and the second side plate, pressure becomes smaller at the area that is closer to the side of the central hole than the first sealed chamber. Therefore, at this low-pressure area, the backward-pressing force F2 becomes smaller, the actual pressing force F becomes larger, and frictional resistance is substantially increased.

In order to address this, according to the fifth aspect, the backward-pressing force F2 applied to the contact surface of the rotors and the second side plate closer to the vicinity of the side of the central hole than the first sealed chamber becomes larger, the actual pressing force F becomes smaller and the frictional resistance is reduced.

According to a sixth aspect of the present invention, a sealing trench portion is provided in the first side plate and passes between the discharge port and the drive shaft, passes through the first and the second sealed chambers and extends as far as an outer periphery of the outer rotor. Further, the sealing unit is disposed within the sealing trench portion. In addition, at an area closer to a side of the central hole than the first sealed chamber, an outer periphery side profile of the intake trench is located at a position further to an inside than an inner periphery side profile of the sealing trench portion, when the intake trench and the sealing trench portion are viewed from the axial direction of the drive shaft.

In a similar manner to previously described, pressure becomes smaller at the area of the contact surface of the rotors and the second side plate that is closer to the side of the central hole than the second sealed chamber. Therefore, at this low-pressure area, the backward-pressing force F2 becomes smaller, the actual pressing force F becomes larger, and frictional resistance is substantially increased.

In order to address this, according to the sixth aspect, the backward-pressing force F2 applied to the contact surface of the rotors and the second side plate closer to the vicinity of the side of the central hole than the second sealed chamber becomes larger, the actual pressing force F becomes smaller and the frictional resistance is reduced.

According to a seventh aspect of the present invention, a sealing trench portion is provided in the first side plate and passes between the discharge port and the drive shaft, passes through the first and the second sealed chambers and extends as far as an outer periphery of the outer rotor. Further, the sealing unit is disposed within the sealing trench portion. In addition, an outer periphery side profile of the intake trench is located at a position further to an inside than an inner periphery side profile of the sealing trench portion, when the intake trench and the sealing trench portion are viewed from the axial direction of the drive shaft.

Accordingly, when the intake trench and the sealing trench portion are viewed from the axial direction of the drive shaft, at an area enclosed by the external periphery side profile of the intake trench and the internal periphery side profile of the sealing trench portion, the backward-pressing force F2 is generated whereas the pressing force F1 is not. In other words, the pressing force F2 is generated at an area where the pressing force F1 is not generated and thus the actual pressing force F becomes smaller and frictional resistance is reduced.

According to an eighth aspect of the present invention, a tapered trench is formed so as to taper in accordance with a rotation direction of the rotation portion. The tapered trench is provided in the axial direction end surface of the second side plate, to which the mechanical seal is applied, in an area that at least one of the outer rotor and the inner rotor passes.

Accordingly, brake fluid within the tapered trench is induced to move toward a tip end of the tapered trench along with rotation of the rotation portion, due to brake fluid viscosity. However, since brake fluid movement is inhibited by the tapered shape, brake fluid pressure increases. As a result of this pressure increase, the backward-pressing force F2 becomes larger, and resultantly the actual pressing force F becomes smaller and frictional resistance is reduced.

According to a ninth aspect of the present invention, a tapered trench is formed so as to taper in accordance with a rotation direction of the rotation portion. This tapered trench is provided in at least one of the axial direction end surface of the outer rotor to which the mechanical seal is applied and the axial direction end surface of the inner rotor to which the mechanical seal is applied.

Accordingly, in the same way as the eighth aspect, pressure within the tapered trench increases along with rotation of the rotation portion, and frictional resistance is reduced.

According to a tenth aspect of the present invention, the sealing unit includes a first seal member which is resin made and is disposed at a bottom side of the sealing trench portion;

and a second seal member disposed closer to a side of an opening hole of the sealing trench portion than the first seal member. The second seal member is in contact with the inner rotor and the outer rotor due to elastic force of the first seal member. Further, a stepped portion is formed in the sealing trench portion such that an inner periphery side of the first seal member is positioned further to an outside than an inner periphery side of the second seal member, when the first seal member and the second seal member are viewed from the axial direction of the drive shaft. Further, at the other drive shaft axial direction side of the rotation portion, the gap between the end surfaces of the outer rotor and the inner rotor in the respective axial directions thereof and the end surface of the second side plate in the an axial directions thereof is sealed by the mechanical seal resulting from the outer rotor and the inner rotor being pushed against the second side plate by the discharge pressure of brake fluid that acts upon the sealing unit.

Accordingly, the inner periphery side of the first seal member is positioned further to an outside than the inner peripheral side of the second seal member, when the first seal member and the second seal member are viewed from the axial direction of the drive shaft. Accordingly, a pressure receiving area of the second seal member is made smaller. Accordingly, the pressing force F1 becomes smaller and thus the actual pressing force F becomes smaller and the frictional resistance is reduced.

According to a eleventh aspect of the present invention, an edge portion of the discharge trench is shaped so as to be rounded or tapered.

In the case that the edge portion of the discharge trench is a substantially right angled shape, layered brake fluid being in a portion between the rotors and the second side plate is prone to be insufficient because it is moved by the edge of the trenches. In contrast to this, according to the eleventh aspect of the present invention, it is possible to inhibit the layered brake fluid from becoming insufficient.

According to a twelfth aspect of the present invention, an edge portion of the intake trench is shaped so as to be rounded or tapered.

In the case that the edge portion of the intake trench is a substantially right angled shape, layered brake fluid being in a portion between the rotors and the second side plate is prone to be insufficient because it is moved by the edge of the trenches. In contrast to this, according to the twelfth aspect of the present invention, it is possible to inhibit the layered brake fluid from becoming insufficient.

According to a thirteenth aspect of the present invention, the edge portion of the tapered trench is shaped so as to be rounded or tapered.

In the case that the edge portion of the tapered trench is a substantially right angled shape, layered brake fluid being in a portion between the rotors and the second side plate is prone to be insufficient because it is moved by the edge of the trenches. In contrast to this, according to the twelfth aspect of the present invention, it is possible to inhibit the layered brake fluid from becoming insufficient.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
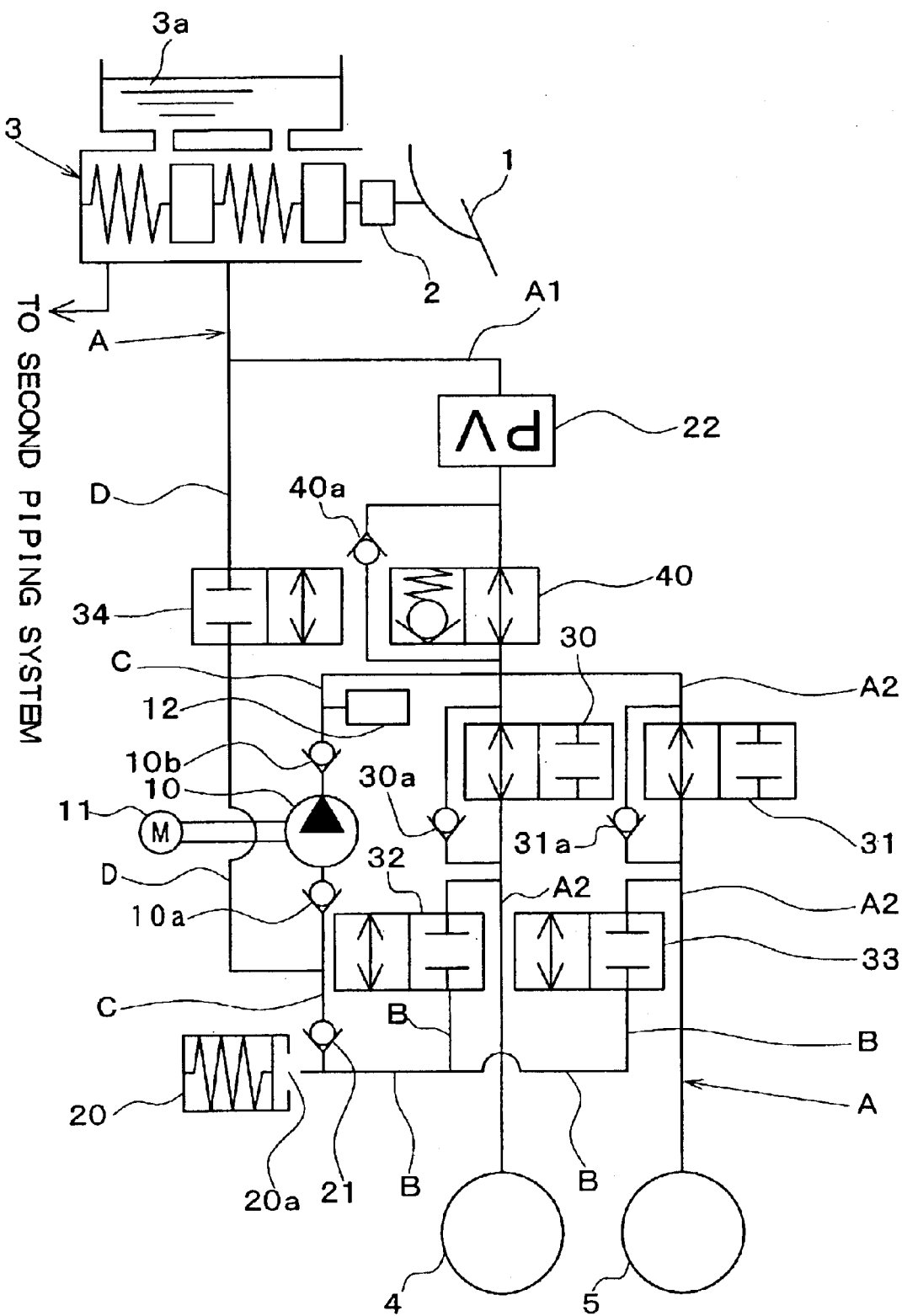
FIG. 1 is a schematic view of a piping system of a braking apparatus provided with a rotary pump according to a first embodiment of the present invention.

The present invention will be described further with reference to various embodiments in the drawings.

(First Embodiment)

Hereinafter, a first embodiment will be explained with reference to the drawings. FIG. 1 is a schematic view of a brake piping system of a braking apparatus to which a trochoid pump has been applied as a rotary pump. A fundamental configuration of the braking apparatus will be explained with reference to FIG. 1. In the first embodiment, an example will be explained in which the braking apparatus according to the present invention is applied to a four-wheeled front-wheel-drive vehicle configured with a hydraulic circuit piping X that is provided with two piping systems, these being a front-right/rear-left wheel piping system and a front-left/rear-right wheel piping system, respectively.

As shown in FIG. 1, a brake pedal 1 is connected to a booster 2, and a brake depression force is increased by the booster 2. The booster 2 has a push rod that transmits the increased brake depression force to a master cylinder 3. A master cylinder pressure is generated by the push rod pushing a master piston disposed in the master cylinder 3. The brake pedal 1, the booster 2 and the master cylinder 3 correspond to a brake fluid pressure generation portion.

The master cylinder 3 is connected to a master reservoir 3a that supplies brake fluid to the master cylinder 3 and stores excess brake fluid from the master cylinder 3.

The master cylinder pressure is transmitted to a wheel cylinder 4 for a front-right wheel FR and a wheel cylinder 5 for a rear-left wheel RL via an anti-lock braking system (hereinafter referred to as "ABS"). It should be noted that, although the following explanation will describe the front-right wheel FR and the rear-left wheel RL, the front-left wheel FL and the rear-right wheel RR that form the second piping system function in the same way, and thus a description will be omitted here.

The braking apparatus is provided with a conduit (main conduit) A connected to the master cylinder 3, and a proportioning valve 22 disposed in the conduit A. The proportioning valve 22 divides the conduit A into two sections. In other words, the conduit A is divided into: a conduit Al that extends from the master cylinder 3 to the proportioning valve 22 and which receives the master cylinder pressure; and a conduit A2 that extends from the proportioning valve 22 to each of the wheel cylinders 4 and 5.

When brake fluid flows in a normal direction, generally, the proportioning valve 22 acts such that a standard pressure of the brake fluid is changed at a certain damping ratio and transmitted to a downstream side of the proportioning valve 22. As shown in FIG. 1, since the proportioning valve 22 is connected in reverse, the pressure of the conduit A2 is defined as the standard pressure.

Within the conduit A2, the conduit A divides into two branches. A first pressure increase control valve 30 for controlling brake fluid pressure increase to the wheel cylinder 4 is provided in one branch. In the other branch, a second pressure increase control valve 31 for controlling brake fluid pressure increase to the wheel cylinder 5 is provided.

These pressure increase control valves 30 and 31 are configured as two position valves having an opened state and a closed state which can be controlled by an electronic control unit (hereinafter referred to as "ECU") for the ABS control. When these two position valves are controlled so as to be in the opened state, the master cylinder pressure or a brake fluid pressure resulting from brake fluid discharged from pump is applied to each of the wheel cylinders 4 and 5. The pressure increase control valves 30 and 31 are controlled so as to normally be in the opened state at times of normal braking when an ABS control is not being executed.

Respective safety valves 30a and 31a are provided in parallel with the pressure increase control valves 30 and 31, such that brake fluid from the wheel cylinders 4 and 5 is discharged when brake depression is stopped and the ABS control is terminated.

Respective pressure decrease control valves 32 and 33 having an opened state and a closed state that can be controlled by the ECU for the ABS control are disposed in respective conduits B that connect a reservoir hole 20a of a reservoir 20 with the respective branches of the conduits A2 at respective points between the first and second pressure increase control valves 30 and 31 and each of the wheel cylinders 4 and 5. These pressure decrease control valves 32 and 33 are normally closed during normal braking (when the ABS control is not being executed).

A rotary pump 10 is disposed in a conduit C connecting a point of conduit A between the proportioning valve 22 and the pressure increase control valves 30 and 31 with the reservoir hole 20a of the reservoir 20. The rotary pump 10 is disposed so as to be sandwiched between safety valves 10a and 10b. A motor 11 is connected to the rotary pump 10 such that the rotary pump 10 is driven by the motor 11. The rotary pump 10 will be explained in more detail hereinafter.

In order to reduce pulsation of brake fluid discharged from the rotary pump 10, a damper 12 is disposed in the conduit C at a discharge side of the rotary pump 10. Further, a conduit (auxiliary conduit) D that connects with the master cylinder 3 is provided between the reservoir 20 and the rotary pump 10. The rotary pump 10 intakes brake fluid from the conduit A1 via the conduit D, and discharges the brake fluid to the conduit A2. Accordingly, a wheel braking force is increased by a wheel cylinder pressure of the wheel cylinders 4 and 5 being made higher than the master cylinder pressure. At this time, the proportioning valve 22 maintains a pressure difference of the master cylinder pressure and the wheel cylinder pressure.

A control valve 34 is provided in the conduit D. This control valve 34 is normally placed in an opened state during normal braking. Further, an check valve 21 is disposed between a section connecting the conduit C with the conduit D and the reservoir 20, so that reverse flow toward the reservoir 20 from the conduit C does not occur due to fluid pressure transmitted from the conduit D.

A control valve 40 is provided in the section of conduit A between the proportioning valve 22 and the pressure increase control valves 30 and 31. The control valve 40 is a two position valve that is normally placed in an opened state. When the master cylinder pressure is lower than a predetermined pressure, and pressures of the wheel cylinders 4 and 5 is rapidly increased in order to brake suddenly, or when a traction control system (TCS) is executed, the control valve 40 is closed, such that a difference between a brake fluid pressure on a side of the master cylinder 3 and that on a side of the wheel cylinder 4 and 5 is maintained.

Further, the control valve 40 is arranged in parallel with the safety valve 40a, such that brake fluid pressure is applied from the side of the master cylinder 3 to the side of the wheel cylinder 4 and 5 when the control valve 40 is in the closed state.

Figure 2A:
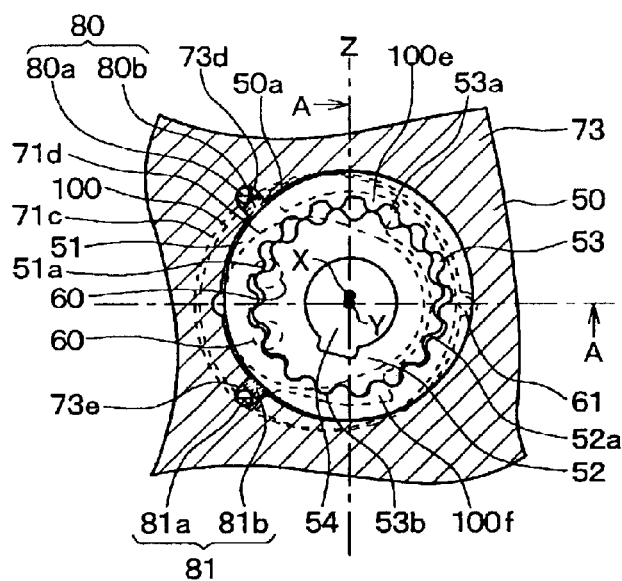
FIG. 2A is a cross-sectional view of the rotary pump of the first embodiment.
Figure 2B:
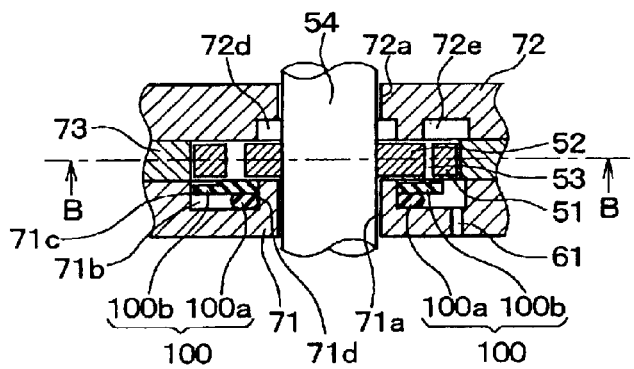
FIG. 2B is a cross-sectional view taken along a line A—A in FIG. 2A.
Figure 2C:
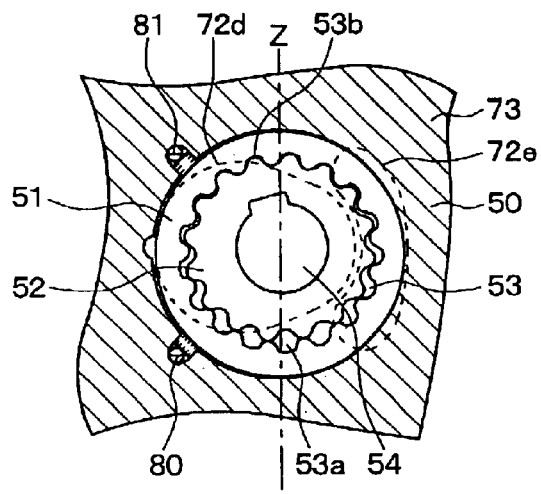
FIG. 2C is a cross-sectional view taken along a line B—B in FIG. 2B

Next, a configuration of the rotary pump 10 will be explained using FIGS. 2A, 2B and 2C. FIG. 2A is a cross-sectional view of the rotary pump 10, FIG. 2B is a cross-sectional view taken along a line A—A in FIG. 2A. FIG. 2C is a cross-sectional view taken along a line B—B in FIG. 2B.

An outer rotor 51 and an inner rotor 52 are housed within a rotor chamber 50a of a casing 50 of the rotary pump 10, and assembled such that respective central axes (indicated by point X and point Y in the figure) are eccentric. The outer rotor 51 is provided with an inner tooth portion 51a at an inner periphery thereof, and the inner rotor 52 is provided with an external tooth portion 52a at an outer periphery thereof. The outer rotor 51 and the inner rotor 52 are meshed such that a plurality of chambers 53 are formed between the tooth portions 51a and 52a.

As is clearly apparent from FIG. 2A, in the rotary pump 10 according to the present embodiment, the sealed chambers 53 are formed between the internal tooth 51a of the outer rotor 51 and the external tooth 52a of the inner rotor 52. Moreover, the rotary pump 10 is a trochoid pump having multiple teeth and no partition plate (crescent member). The inner rotor 52 and the outer rotor 51 have a plurality of contact points in order to transmit a rotation torque of the inner rotor 52.

As shown in FIG. 2B, the casing 50 is formed from a first side plate 71 and a second side plate 72 disposed so as to sandwich both rotors 51 and 52 from respective ends; and a central plate 73 having a hole that accommodates the outer rotor 51 and the inner rotor 52 that are disposed between the first and second side plates 71 and 72. Accordingly, the rotor chamber 50*a* is formed by these elements.

Central holes 71*a* and 72*a* that communicate with the inside of the rotor 50*a* are formed at a central portion of the first and second side plates 71 and 72. A drive shaft 54 is fitted into these central holes 71*a* and 72*a*. The outer rotor 51 and the inner rotor 52 are disposed so as to be freely rotatable within the hole of the central plate 73. In other words, a rotation portion configured from the outer rotor 51 and the inner rotor 52 is assembled within the rotor chamber 50*a* of the casing 50 so as to be freely rotatable. The outer rotor 51 rotates with the point X as an axis, and the inner rotor 52 and the drive shaft 54 rotate with the point Y as an axis.

If a line that passes through points X and Y, which are the respective rotation axes of the outer rotor 51 and the inner rotor 52, is set as a central line Z of the rotary pump 10, an intake port 60 and a discharge port 62 that communicate with the rotor chamber 50*a* are formed in the left and right portions of the first side plate 71, around the central line Z. The intake port 60 and the discharge port 61 are communicated with the plurality of chambers 53. Accordingly, it possible for brake fluid to be intaken to the chambers 53 from outside via the intake port 60, and then for brake fluid within the chambers 53 to be discharged to outside via the discharge port 61.

Further, the structure is such that a sealed chamber 53*a* having the largest volume and a sealed chamber 53*b* having the smallest volume among the plurality of chambers 53, do not communicate with either the intake port 60 or the discharge port 61. Due to these sealed chambers 53*a* and 53*b*, a pressure difference between an intake pressure of the intake port 60 and a discharge pressure of the discharge port 61 is maintained.

A communicating passage, not shown, that communicates an outer periphery of the outer rotor 51 and the intake port 60, and a communicating passage, not shown, that communicates the outer periphery of the outer rotor 51 and the discharge port 61 are provided in the first side plate 71.

Further, respective recess portions 73*d* and 73*e* are formed in an internal wall surface of the central plate 73. More specifically, the recess portions 73*d* and 73*e* are formed in a portion of the central plate 73 that forms the hole of the central plate 73 at respective positions that are, if the point X that is the rotation axis of the outer rotor 51 is defined as a center, approximately 45 degrees away from the central axis Z in the direction of the intake port 60. Seal members 80 and 81 for inhibiting flow of brake fluid at the outer periphery of the outer rotor 51 are provided within these recess portions 73*d* and 73*e*. The seal members 80 and 81 are configured so as to act as seals for a low-pressure area and a high-pressure area.

The seal member 80 is formed from a rubber member 80*a* having a substantially cylindrical shape, and a Teflon-made resin member 80*b* that is rectangular parallelepiped. The resin member 80*b* is pressed by the rubber member 80*a* so as to come into contact with the outer rotor 51. In other words, although a small margin of error in a size of the outer rotor 51 results from manufacturing mistakes, and the like, it is possible to absorb this error using the rubber member 80*a* having elastic force.

Moreover, as shown in FIG. 2B, a sealing trench portion 71*b* is formed in the first side plate 71. The sealing trench portion 71*b*, as shown by a broken line in FIG. 2A, has a substantially circular external periphery side profile 71*c* and an oval internal periphery side profile 71*d*, and as a whole, forms a ring shape that surrounds the drive shaft 54. A center of the sealing trench portion 71*b* is eccentric to a side of the intake port 60 (i.e., the left side of the paper) with respect to the central axis of the drive shaft 54. Accordingly, the sealing trench portion 71*b* is disposed so as to pass between the discharge port 61 and the drive shaft 54, pass around a section where the sealed chambers 53*a* and 53*b*, and pass portion of the seal members 80 and 81 that seal outer periphery of the outer rotor 51, and has a structure that protrudes toward and communicates with the discharge port 61.

A seal member 100 is disposed in the sealing trench portion 71*b*. The seal member 100 is configured from an elastic member 100*a* that is ring shaped and formed from an elastic material, such as rubber, or the like; and a resin member 100*b* formed from resin.

Figure 3:
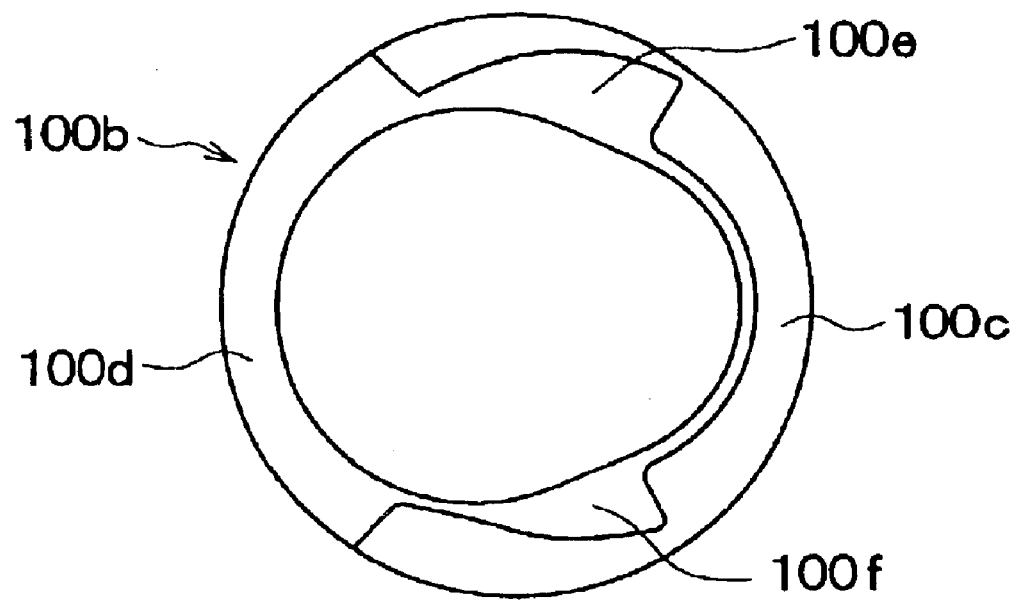
FIG. 3 is a schematic view of a seal member 100 shown in FIG. 2.

The resin member 100*b*, as shown in FIG. 3, is formed with substantially the same shape as the sealing trench portion 71*b*, and is ring shaped. The resin member 100*b* is a stepped plate having a recess portion 100*c* and a protruding portion 100*d* formed at one end surface thereof.

The resin member 100*b* is disposed at an opening hole side of the sealing trench portion 71*b* such that the protruding portion 100*d* is in contact with end surfaces of both of the rotors 51 and 52 and the central plate 73. The elastic member 100*a* is disposed closer to a bottom side of the sealing trench portion 71*b* than the resin member 100*b*. According to this structure, a sealing function is achieved by the resin member 100*b* being pushed by elastic force of the elastic member 100*a* and a discharge pressure of the brake fluid supplied to the sealing trench portion 71*b*.

Enlarged width portions 100*e* and 100*f* are formed in the protruding portion 100*d* and are configured with a width that completely covers the chambers 53 that does not communicate with a discharge trench 72*e*. Accordingly, the enlarged width portions 100*e* and 100*f* act as a seal for inhibiting leakage of brake fluid within the chambers 53.

As a result of the seal member 100 being disposed in this manner, it is possible to seal between a high-pressure area i.e., the discharge port 61, and a low-pressure area i.e., a gap between the drive shaft 54 and the inner rotor 52, and seal the intake port 60, at a gap between end surfaces in an axial direction of the inner rotor 52 and the outer rotor 51 shown at the bottom side of the paper of FIG. 2B and the first side plate 71 in FIG. 2B.

Further, in order to seal the high-pressure area and the low-pressure area at the gap between the end surface in the axial direction of the inner rotor 52 and the outer rotor 51 shown at the bottom side of the paper and the first side plate 71, it is necessary to provide the seal member 100 such that it passes between the discharge port 61 and the drive shaft 54, passes through the chambers 53 between the discharge port 61 and the intake port 60, and extends as far as an outer periphery of the outer rotor 51.

In the present embodiment, in order to seal the high pressure area and the low-pressure area, it is essential that the seal member 100 passes from the seal member 80, a portion between the drive shaft 54 and the discharge port 61, and extends as far as the seal member 81. While this area is sealed, the recess portion 100*c* is provided at other areas that are not required sealing, and at sufficiently sealed areas. Accordingly, an area in contact with the inner rotor 52 and the outer rotor 51 is reduced to being so small that if can effectively be ignored. Therefore, it is possible to reduce both contact resistance due to the seal member 100 and mechanical loss.

On the other hand, as shown in FIG. 2B, regarding the end surfaces in the axial direction of the outer rotor 51 and the inner rotor 52, which are positioned to the upper side of the paper the rotors 51 and 52, are slid in a state in which each end surface is pressed against an axial direction end surface of the second plate 72 by the high pressure. Accordingly, a mechanical sealing structure for sealing high and low pressures is realized.

As shown in FIGS. 2B and 2C, an intake trench 72*d* communicating with the intake port 60 and a discharge trench 72*e* communicating with the discharge port 61 are formed in the axial direction end surface of the second side plate 72 that carries out this mechanical sealing function.

The intake trench 72*d*, as shown by the broken line in FIG. 2C, is formed so as to enclose the drive shaft 54. The center of the intake trench 72*d* is eccentric to the side of the intake port 60 (the left side of the paper) with respect to the axial center of the drive shaft 54. More specifically, an external periphery side profile of the intake trench 72*d* has the same shape and size as an internal periphery side profile 71*d* of the sealing trench portion 71*b*. Further, the intake trench 72*d* is disposed such that the external periphery side profile of the intake trench 72*d* is disposed so as to overlap with the internal periphery side profile 71*d* of the sealing trench portion 71*b*, when viewed from the axial direction of the drive shaft 54.

A discharge trench 72*e*, as shown by the broken line in FIG. 2C, has a circular-arc shape extending along a rotation direction of the rotation portion. The intake trench 72*e* is disposed closer to the discharge port 61 than the central axis Z, namely, closer to the chambers 53 communicating with the discharge port 61. The discharge trench 72*e* is disposed so as to, when viewed from an axial direction of the drive shaft 54, overlap with the chambers 53 communicating with the discharge port 61; and to overlap with an end portion of a peripheral portion of the chambers 53, among the axial direction end surfaces of the outer rotor 51 and the inner rotor 52, that communicate with the discharge port 61. Further, the discharge trench 72*e* is disposed so as to face an area of the end surfaces of the outer rotor 51 and the inner rotor 52 on the side of the first side plate 71 where discharge pressure acts.

Next, an operation of the braking apparatus and the rotary pump 10 configured as described above will be explained.

When large braking force is required, the control valve 34 of the braking apparatus is appropriately placed in the opened state when, for example, braking force in accordance with the brake depression force cannot be obtained, or when an operation amount of the brake pedal 1 is large. Further, a high-pressure master cylinder pressure that is generated through the conduit D by depression of the brake pedal 1 is applied to the rotary pump 10.

In the rotary pump 10, the inner rotor 52 rotates in accordance with rotation of the drive shaft 54 resulting from drive of the motor 11, and accompanying this, meshing of the internal tooth portion 51*a* and the external tooth portion 52*a* causes the outer rotor 52 to also rotate in the same direction. At this time, while the outer rotor 51 and the inner rotor 52 perform one rotation, the volume of the respective chambers 53 change so as to become larger and smaller. Accordingly, brake fluid is intaken to the intake port 60, and then the brake fluid is discharged toward the conduit A2 from the discharge port 61.

In this way, the rotary pump 10 executes a fundamental pump operation in which brake fluid is intaken to the intake port 60 and discharged from the discharge port 61 due to rotation of the rotors 51 and 52. Increase of the wheel cylinder pressure is achieved by the brake fluid discharged by the rotary pump 10.

During this pump operation, an area of the periphery of the outer rotor 51 on a side of the intake port 60 is set to an intake pressure by brake fluid intaken via the communicating passage, and an area of the periphery of the outer rotor 51 on a side of the discharge port 61 is set to a discharge pressure due to brake fluid intaken via the communicating passage. Accordingly, the low-pressure area and the high-pressure area are formed at the periphery of the outer rotor 51. Further, high-pressure and low-pressure areas are also formed at the gap between the axial direction end surfaces of the inner rotor 52 and the outer rotor 51 and the first and the second side plates 71 and 72. This means that, the low pressure area is formed at the intake port 60 and the gap between the drive shaft 54 and the inner rotor 52, while the high pressure area is formed at the discharge port 61.

In order to address this, the seal members 80 and 81 and the seal member 100 are provided, it is possible to inhibit the occurrence of brake fluid leakage from the high pressure side to the low pressure side at the periphery of the outer rotor 51, or via the gap between the axial direction end surfaces of the outer rotor 51 and the inner rotor 52 and the first side plate 71. It should be noted that the seal member 100 as shown in FIG. 2B does not come into contact with the outer rotor 51 and the inner rotor 52. However, the seal member 100 bends as the pressure of the discharge port 61 increases, and fulfils the sealing function by coming into complete contact with the outer rotor 51 and the inner rotor 52.

The axial direction end surfaces of the outer rotor 51 and the inner rotor 52 fulfil the mechanical seal function by being pressed so as to directly contact with the second side plate 72. Accordingly, it is possible to inhibit the occurrence of brake fluid leakage from the high pressure side to the low pressure side via the gap between the axial direction end surfaces of the outer rotor 51 and the inner rotor 52 and the second side plate 72.

Further, due to the seal members 80 and 81, the area of the periphery of the outer rotor 51 on the side of the intake port 60 has its brake pressure decreased, and becomes the same pressure as the chambers 53 communicating with the intake port 60. The area of the periphery of the outer rotor 51 on the side of the discharge port 61 has its brake pressure increased, and becomes the same pressure as the chambers 53 communicating with the discharge port 61. Accordingly, pressure balance between the inside and the outside of the outer rotor 51 is maintained, and it is possible to stably execute the pump operation.

In the present embodiment, both rotors 51 and 52 are pressed back toward the side of the first side plate 71 by brake fluid discharge pressure supplied by the discharge trench 72*e*. Therefore, the force pressing both rotors 51 and 52 against the second side plate 72 is decreased, and frictional resistance is reduced. Accordingly, it is possible to prevent or inhibit increase in drive torque when utilizing the mechanical seal.

Further, a contact area of both rotors 51 and 52 and the second side plate 72 is made smaller by an amount equivalent to the intake trench 72*d*, and thus it is possible to reduce shear resistance of the brake fluid. Accordingly, it is possible to prevent or inhibit increase in drive torque when utilizing the mechanical seal.

Moreover, the discharge trench 72*e* of the second side plate 72 is formed at the position facing the area of the end surfaces of the rotors 51 and 52 on the side of the first side plate 71 where discharge pressure acts. The intake trench 72d of the second side plate 72 is formed at a position facing an area of the end surfaces of the rotors 51 and 52 on the side of the first plate 71 where intake pressure acts. Therefore, it is possible to maintain pressure balance of both sides of both of the rotors 51 and 52, and inhibit increase in drive torque due to contact caused by the rotors 51 and 52 being unbalance and thus tending toward and abutting with one of the first and second side plates 71 and 72, and the like.

(Second Embodiment)

Figure 4A:
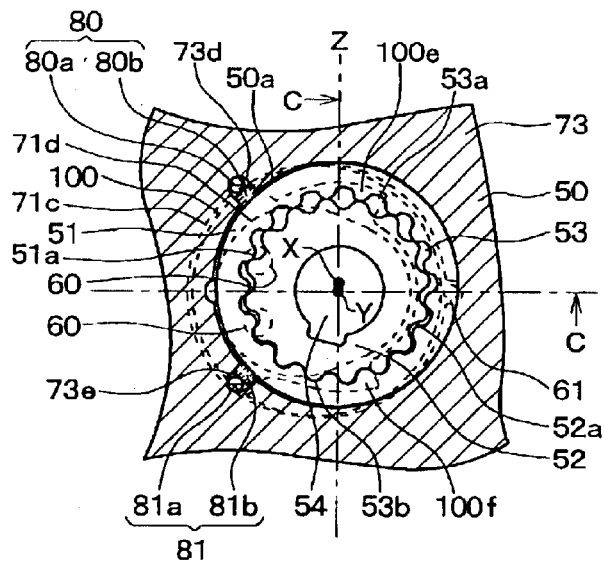
FIG. 4A is a cross-sectional view of the rotary pump according to a second embodiment of the present invention.
Figure 4B:
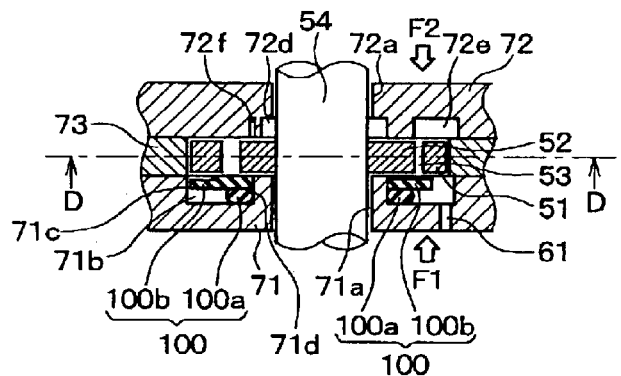
FIG. 4B is a cross-sectional view taken along a line C—C in FIG. 4A.
Figure 4C:
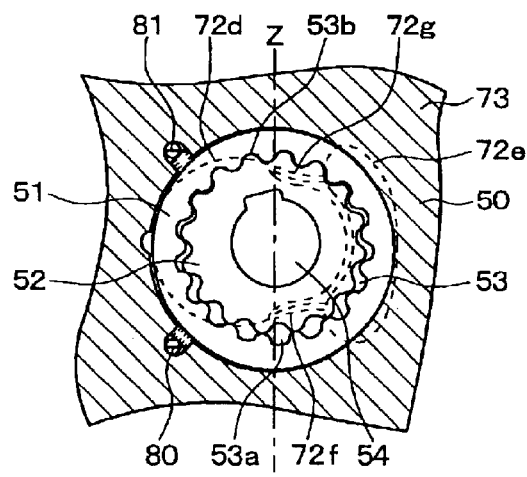
FIG. 4C is an cross-sectional view taken along a line D—D in FIG. 4B

In the present embodiment, in distinction to the first embodiment, the second side plate 72 is additionally provided with extended trenches 72f and 72g. FIG. 4A is a cross-sectional view of the rotary pump 10 according to the present embodiment; FIG. 4B is a cross-sectional view taken along a line C—C in FIG. 4A; and FIG. 4C is an cross-sectional view taken along a line D—D in FIG. 4B. Structural members that are the same as or equivalent to those of the first embodiment are denoted with the same reference numerals, and their explanation is omitted.

In the present embodiment the extended trenches 72f and 72g are formed on the axial direction end surface of the second side plate 72. These extended trenches 72f and 72g extend toward the discharge trench 72e from an area that is closer to the side of the central hole 72a than the sealed chambers 53a and 53b.

A pressing force F1 that presses the rotors 51 and 52 toward the second side plate 72 results from brake fluid discharge pressure that acts upon the seal member 100. A backward-pressing force F2 that presses the rotors 51 and 52 toward the first side plate 71 results from brake fluid pressure of brake fluid that has entered at a contact surface of the rotors 51 and 52 and the second side plate 72. Further, an actual pressing force F that acts on both rotors 51 and 52 and actually presses the rotors 51 and 52 toward the second side plate 72 is the difference between the pressing force F1 and the backward-pressing force F2.

The pressing force F1 is constant in all areas, whereas the backward-pressing force F2 varies from area to area. According to research conducted by the applicant, it is clear that, at the contact surface of the rotors 51 and 52 and the second side plate 72, the pressure becomes lower at the area that is closer to the side of the central hole 72a than that toward the sealed chambers 53a and 53b. Accordingly, at this low-pressure area, the backward-pressing force F2 becomes smaller, the actual pressing force F becomes larger, and thus the frictional resistance becomes substantially larger.

In order to address this, according to the present embodiment, the extended portions 72f and 72g are formed. Accordingly, brake fluid discharge pressure acts on the area of the contact surface of both of the rotors 51 and 52 and the second side plate 72 that is closer to the side of the central hole 72a than the sealed chambers 53a and 53b. Accordingly, the actual pressing force F of this area becomes smaller, and frictional resistance is reduced.

(Third Embodiment)

Figure 5A:
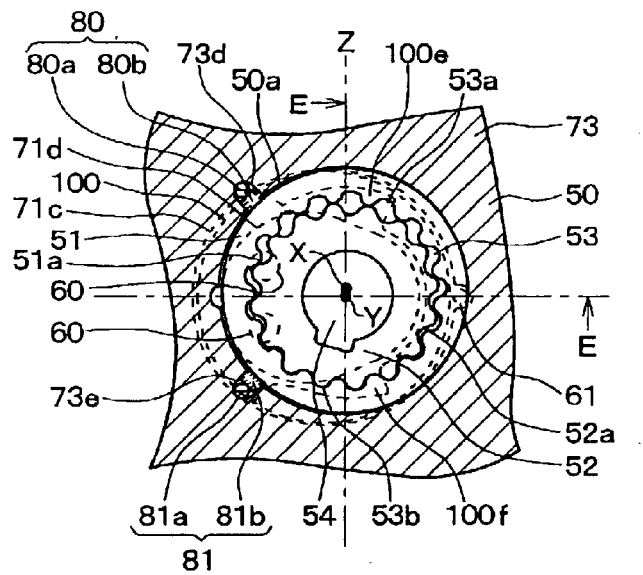
FIG. 5A is a cross-sectional view of the rotary pump according to a third embodiment of the present invention.
Figure 5B:
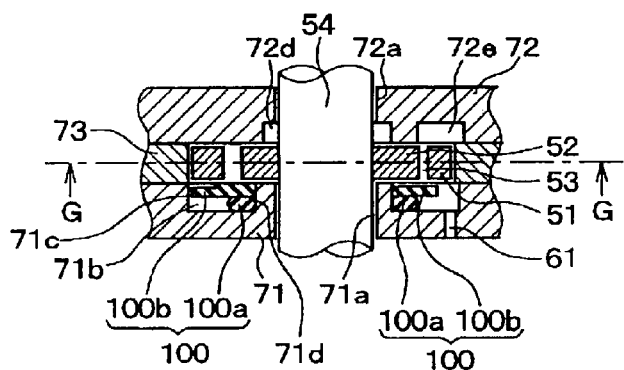
FIG. 5B is a cross-sectional view taken along a line E—E in FIG. 5A.
Figure 5C:
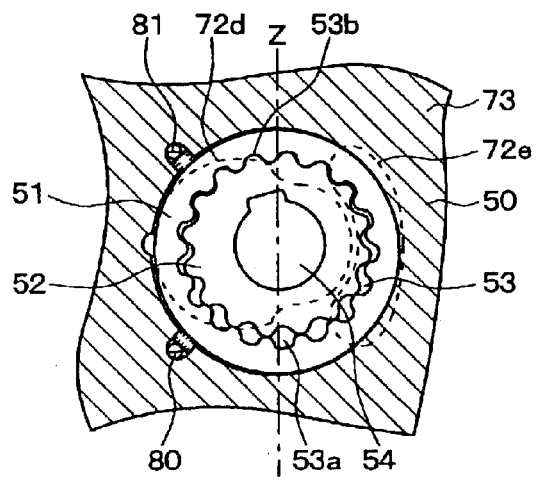
FIG. 5C is a cross-sectional view taken along a line G—G in FIG. 5B.

In the present embodiment the shape of the external periphery side profile of the intake trench 72d of the first embodiment is modified. FIG. 5A is a cross-sectional view of the rotary pump 10 according to the present embodiment; FIG. 5B is a cross-sectional view taken along a line E—E in FIG. 5A; and FIG. 5C is a cross-sectional view taken along a line G—G in FIG. 5B. Structural members that are the same as or equivalent to those of the first embodiment are denoted with the same reference numerals, and their explanation is omitted.

In the present embodiment the external periphery side profile of the intake trench 72 is offset to the side of the drive shaft 54 in the area that is closer to the side of the central hole 72a than the sealed chambers 53a and 53b. Accordingly, when viewed from the axial direction of the drive shaft 54, the external periphery side profile of the intake trench 72d at the area closer to the central hole 72a than the sealed chambers 53a and 53b is offset further toward the inner radial direction side than the internal periphery side profile 71d of the sealing trench portion 71b. In other areas, the external periphery side profile of the intake trench 72d overlaps with the internal periphery side profile 71d of the sealing trench portion 71b.

In a similar manner to previously described, pressure becomes smaller at the area of the contact surface of both of the rotors 51 and 52 and the second side plate 72 that is closer to the side of the central hole 72a than the sealed chambers 53a and 53b. Therefore, at this low-pressure area, the backward-pressing force F2 becomes smaller, the actual pressing force F becomes larger, and frictional resistance is substantially increased.

In order to address this, according to the present embodiment, the external periphery side profile of the intake trench 72d at the area closer to the side of the central hole 72a than the sealed chambers 53a and 53b is offset further toward the inside than the internal periphery side profile 71d of the sealing trench portion 71b. Accordingly, the backward-pressing force F2 applied to this area increases, the actual pressing force F becomes smaller and the frictional resistance is decreased.

(Fourth Embodiment)

Figure 6A:
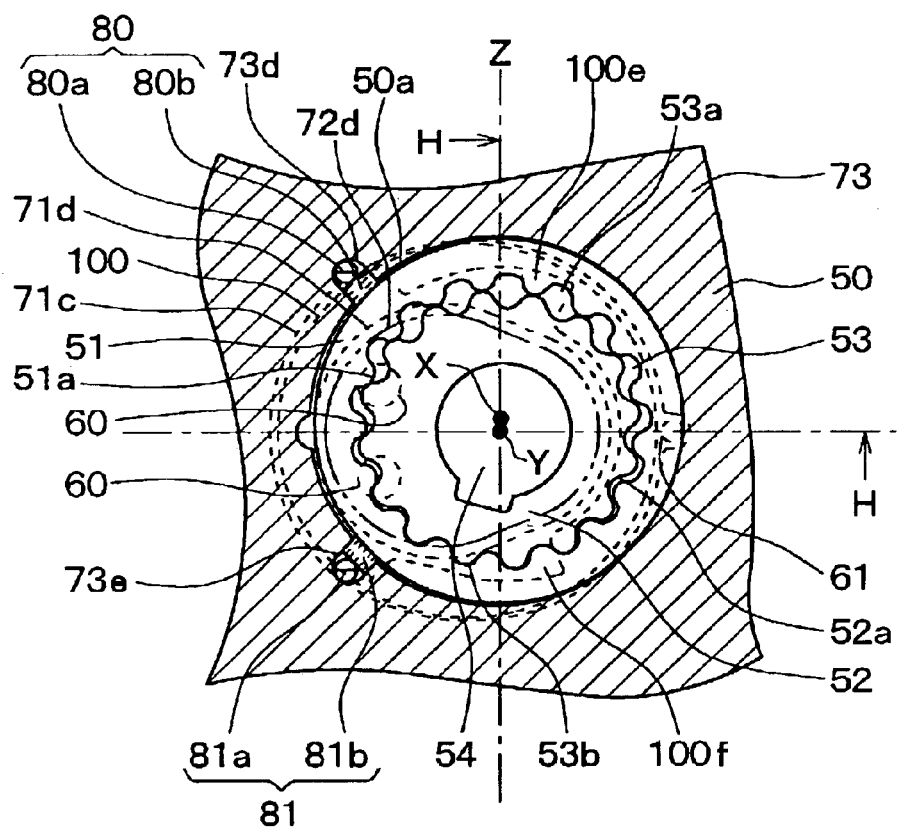
FIG. 6A is a cross-sectional view of the rotary pump according to a fourth embodiment of the present invention.
Figure 6B:
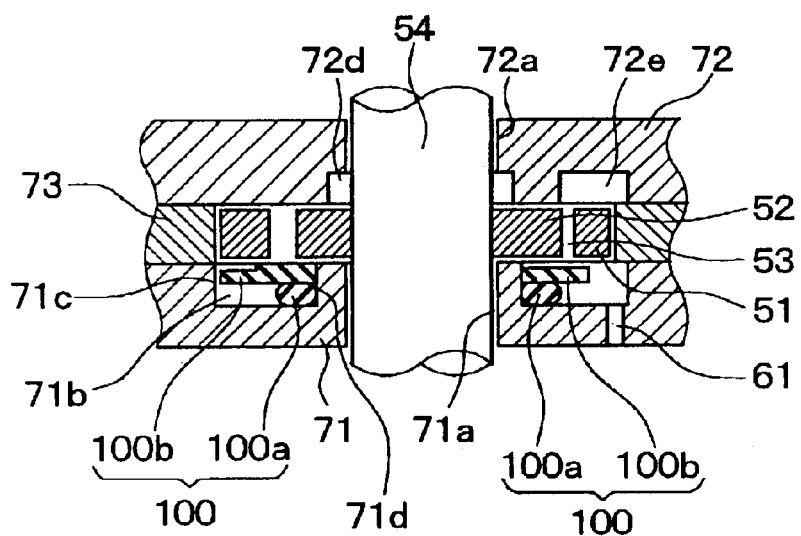
FIG. 6B is a cross-sectional view taken along a line H—H in FIG. 6A.

In the present embodiment, the size of the external periphery side profile of the intake trench 72d of the first embodiment is modified. FIG. 6A is a cross-sectional view of the rotary pump 10 according to the present embodiment; and FIG. 6B is a cross-sectional view taken along a line H—H in FIG. 6A. Structural members that are the same as or equivalent to those of the first embodiment are denoted with the same reference numerals, and their explanation is omitted.

Note that, in FIG. 6A, the intake trench 72d is indicated by a dot-dash line in order to facilitate easy understanding of the inter-relationship of the sealing trench portion 71b and the intake trench 72d.

In the present embodiment, when viewed from the axial direction of the drive shaft 54, the external periphery side profile of the intake trench 72d is offset throughout its entirety so as to be further toward the inside than the inner periphery side profile 71d of the sealing trench portion 71b. In other words, the size of the external periphery side profile of the intake trench 72d is made smaller.

In a similar manner to previously described, pressure becomes smaller at the area of the contact surface of both of the rotors 51 and 52 and the second side plate 72 that is closer to the side of the central hole 72a than the sealed chambers 53a and 53b. Therefore, at this low-pressure area, the backward-pressing force F2 becomes smaller, the actual pressing force F becomes larger, and frictional resistance is substantially increased.

In order to address this, according to the present embodiment, the external periphery side profile of the intake trench 72d is offset further toward the inside than the inner periphery side profile 71d of the sealing trench portion 71b. Accordingly, at an area enclosed by the external periphery side profile of the intake trench 72d and the internal periphery side profile 71d of the sealing trench portion 71b, the backward-pressing force F2 is generated whereas the pressing force F1 is not. Put in other terms, the pressing force F2 is generated at a area where the pressing force F1 is not generated and thus the actual pressing force F becomes small and frictional resistance is reduced.

(Fifth Embodiment)

Figure 7A:
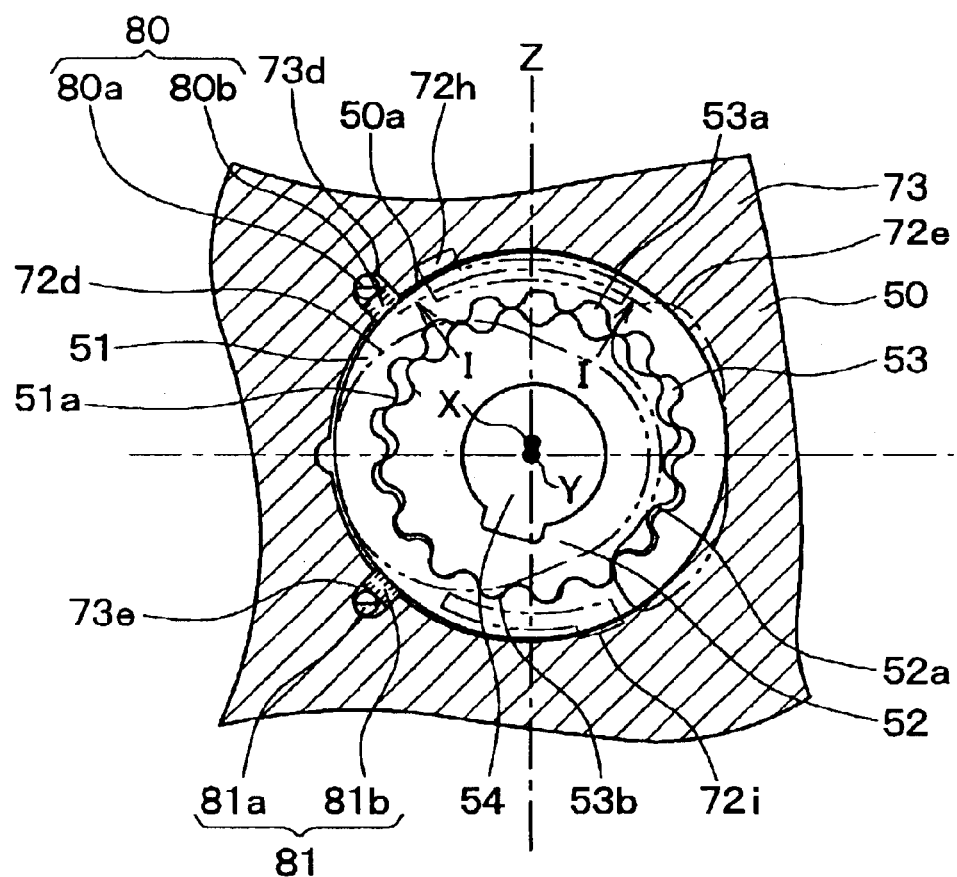
FIG. 7A is a cross-sectional view of the rotary pump according to a fifth embodiment of the present invention.
Figure 7B:
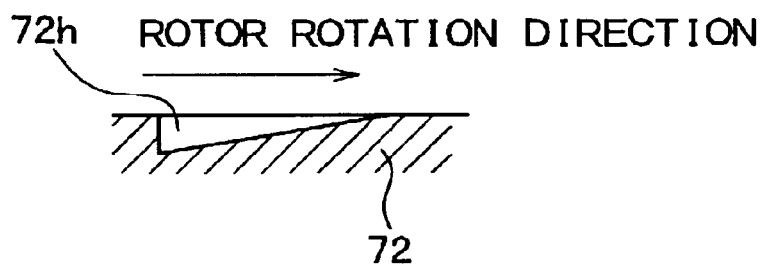
FIG. 7B is an auxiliary cross-sectional view along a line I—I in FIG. 7A.

In the present embodiment, tapered trenches 72h and 72i are further added to the first embodiment. FIG. 7A is a cross-sectional view of the rotary pump 10 according to the present embodiment; and FIG. 7B is an auxiliary cross-sectional view along a line I—I in FIG. 7A. Structural members that are the same as or equivalent to those of the first embodiment are denoted with the same reference numerals, and their explanation is omitted.

In the present embodiment, the tapered trenches 72h and 72i that are tapered in accordance with a rotation direction of the rotation portion are provided at an area of the axial direction end surface of the second side plate 72, to which the mechanical seal is applied, that the outer rotor 51 passes. Each of the tapered trenches 72h and 72i is communicated at a largest depth portion with the high-pressure area of the external periphery of the outer rotor 51. All other portions of the tapered trenches 72h and 72i are in a non-communicating isolated state.

As a result, pressure within the tapered trenches 72h and 72i is the same as the discharge pressure at the maximum depth portion. Further, brake fluid within the tapered trenches 72h to 72i is induced to move toward a tip end of the tapered trenches 72h to 72i along with rotation of the rotation portion, due to the brake fluid viscosity. However, since brake fluid movement is inhibited by the tapered shape, brake fluid pressure increases at the tip side. Accordingly, the backward-pressing force F2 becomes larger by this pressure increase amount, and resultantly the actual pressing force F becomes smaller and frictional resistance is reduced.

Further, a lifting effect of the outer rotor 51 is caused by this induced movement of the brake fluid, and thus it is possible to expect that brake fluid will be supplied to sliding surfaces in the vicinity of the tapered trenches 72h and 72i.

It should be noted that if a tapered trench tapered in accordance with a rotation direction of the rotation portion is provided at an area of the axial direction end surface of the second side plate 72 that the inner rotor 52 passes, the same effect can be expected.

Moreover, a tapered trench that tapers in accordance with a reverse rotation direction of the rotation portion may alternatively be provided in the outer rotor 51 and the inner rotor 52 at a surface facing the second side plate 72.

(Sixth Embodiment)

Figure 8A:
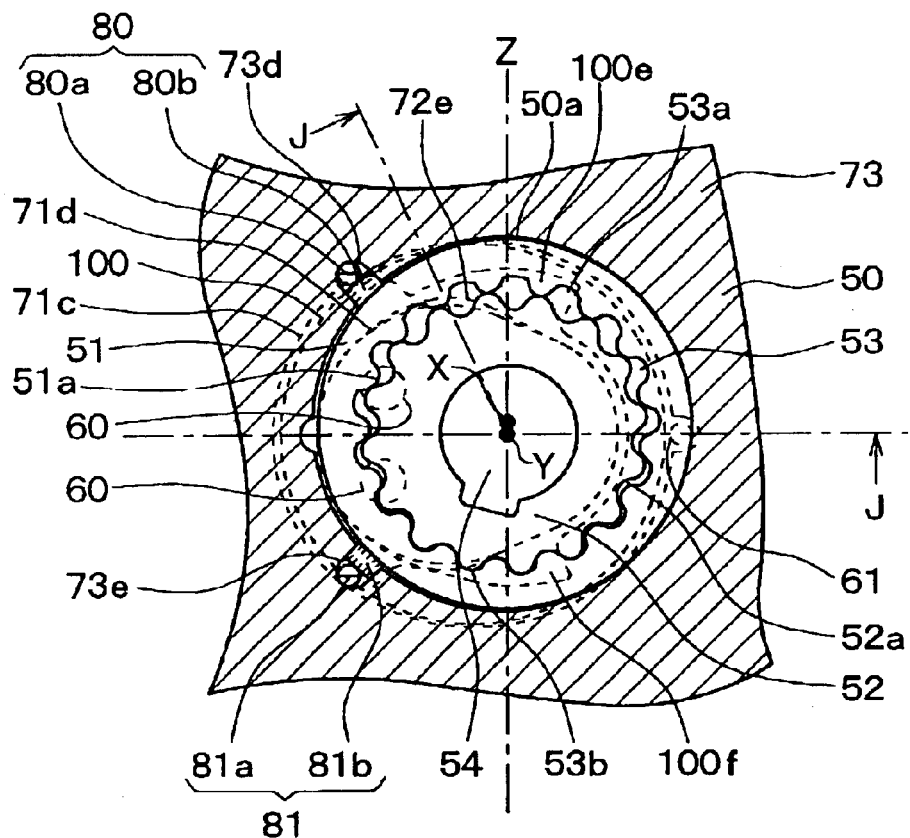
FIG. 8A is a cross-sectional view of the rotary pump according to a sixth embodiment of the present invention.
Figure 8B:
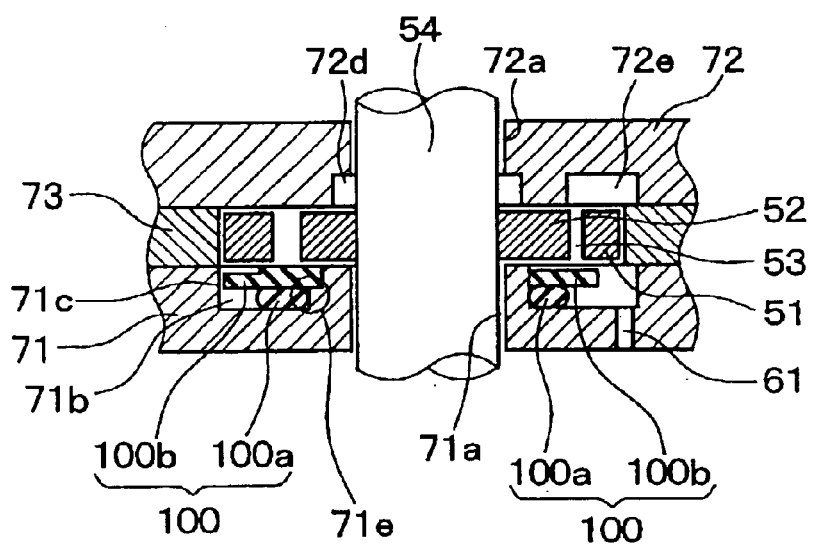
FIG. 8B is a cross-sectional view taken along a line J—J in FIG. 8A.

In the present embodiment, in contrast to the first embodiment, a stepped portion 71e is formed in a portion of the inner periphery side profile 71d of the sealing trench portion 71b. FIG. 8A is a cross-sectional view of the rotary pump 10 according to the present embodiment; and FIG. 8B is a cross-sectional view taken along a line J—J in FIG. 8A. Structural members that are the same as or equivalent to those of the first embodiment are denoted with the same reference numerals, and their explanation is omitted.

In the present embodiment, the stepped portion 71e is formed in the inner periphery side profile 71d of the sealing trench portion 71b in a vicinity of the sealed chambers 53a and 53b. The stepped portion 71e enlarges the inner periphery side profile 71d of the sealing trench portion 71b in the vicinity of the sealed chambers 53a and 53b. More specifically, the stepped portion 71e has a shape such that, when the seal member 100 is viewed from the axial direction of the drive shaft 54, an inner periphery side of a position where the elastic member 100a is disposed is further to the external side than an inner periphery side of a position where the resin member 100b is disposed. Accordingly, a pressure receiving surface area of the resin member 100b that receives brake fluid pressure is made smaller.

Put in other terms, when viewed from the axial direction of the drive shaft 54, the external periphery side profile of the intake trench 72d and the inner periphery side profile 71d of the sealing trench portion 71b are disposed so as to overlap. However, at the stepped portion 71e, the inner periphery side of the position at which the elastic member 100a is disposed is located to the radial direction external side of the external periphery side profile of the intake trench 72d.

In a similar manner to previously described, at the area closer to the side of the central hole 72a than the sealed chambers 53a and 53b, there is a tendency for frictional resistance to become substantially larger due to the backward-pressing force F2 becoming smaller. However, by forming the stepped portion 71e in the vicinity of the sealed chambers 53a and 53b, the pressure receiving area of the resin member 100b of this area is made smaller. Accordingly, the pressing force F1 becomes smaller and thus the actual pressing force F becomes smaller and the frictional resistance is reduced.

(Seventh Embodiment)

In the present embodiment an edge portion of each of the trenches 72d to 72i of the second side plate 72 is shaped so as to have a rounded surface or a taper by dry etching.

Figure 9A:
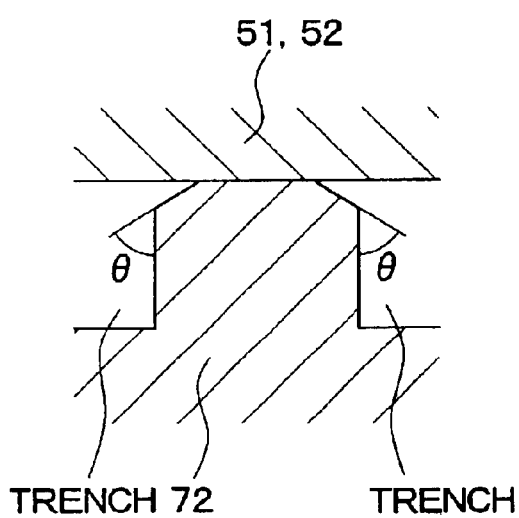
FIGS. 9A and 9B are cross-sectional views of a main portion of a rotary pump according to a seventh embodiment of the present invention.

FIG. 9A shows an example of an edge portion of each of the trenches 72d to 72i of the second side plate 72 at a contact side with the rotors 51 and 52. The edge portion has a taper which has been chamfered and which has a predetermined angle θ (more specifically, 0<θ<90 degrees).

Figure 9B:
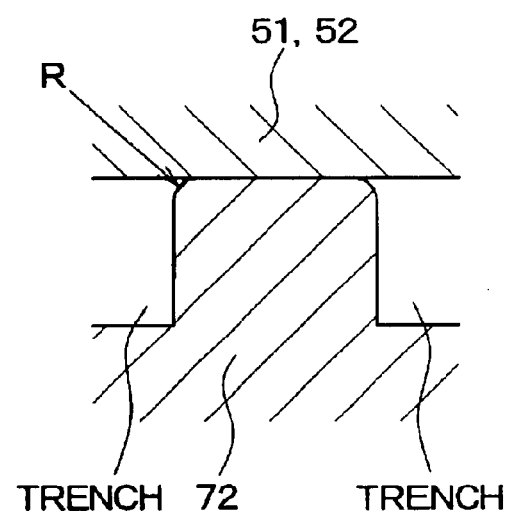

FIG. 9B shows an example of an edge portion of each of the trenches 72d to 72i of the second side plate 72 at a contact side with the rotors 51 and 52, which is shaped with a rounded surface (with radius R).

In the case that the edge portion of each of the trenches 72d to 72i of the second side plate 72 is a substantially right angled shape, a layered brake fluid being in a portion between the rotors 51 and 52 and the second side plate 72 is prone to be insufficient because it is moved by the edge of the trenches 72d to 72i. In contrast to this, when the edge portion is given a rounded surface or a taper as in the case of the present embodiment, it is possible to inhibit or prevent the layered brake fluid from becoming insufficient, and thus reduce loss of torque.

While the above description is of the preferred embodiments of the present invention, it should be appreciated that the invention may be modified, altered, or varied without deviating from the scope and fair meaning of the following claims.

What is claimed is:

1. A rotary pump for a braking apparatus, comprising:
    an outer rotor having an internal tooth portion at an internal periphery thereof;
    an inner rotor having an external tooth portion at an external periphery thereof and for performing rotary motion with a drive shaft as an axis;

a rotation portion configured by combining the outer rotor and the inner rotor such that a plurality of chambers are formed between the internal tooth portion and the external tooth portion; and a casing including a central hole into which the drive shaft is fitted, an intake port for intake of brake fluid to the rotation portion, and a discharge port for discharging brake fluid from the rotation portion, this casing housing the rotation portion, wherein brake fluid is intaken by the intake port and brake fluid is discharged by the discharge port due to rotary motion of the rotation portion, while a pressure difference between the intake port and the discharge port is maintained by a first sealed chamber having a largest volume and a second sealed chamber having a smallest volume among the plurality of chambers, the casing is configured to include a first and a second side plate that sandwich the outer rotor and the inner rotor in an axial direction of the drive shaft, at one of the drive shaft axial direction sides of the rotation portion, a gap between end surfaces of the outer rotor and the inner rotor in respective axial directions thereof and an end surface of the first side plate in an axial direction thereof is sealed by a sealing unit provided in the first side plate, at the other drive shaft axial direction side of the rotation portion, a gap between end surfaces of the outer rotor and the inner rotor in the respective axial directions thereof and an end surface of the second side plate in the axial direction thereof is sealed by a mechanical seal resulting from the outer rotor and the inner rotor being pushed against the second side plate by a discharge pressure of brake fluid that acts upon the sealing unit, a discharge trench communicating with the discharge port is formed in the axial direction end surface of the second side plate to which the mechanical seal is applied, a first extended trench extending from the discharge trench toward a first area of the axial direction end surface of the second side plate to which the mechanical seal is applied, the first area being closer to a side of the central hole than to the first sealed chamber, and a second extended trench extending from the discharge trench toward a second area of the axial direction end surface of the second side plate to which the mechanical seal is applied, the second area being closer to the side of the central hole than to the second sealed chamber.

2. The rotary pump for a braking apparatus according to claim 1, further comprising:

an intake trench communicating with the intake port that is provided at the axial direction end surface of the second side plate to which the mechanical seal is applied.

3. The rotary pump for a braking apparatus according to claim 1, wherein an edge portion of the discharge trench is shaped so as to be rounded or tapered.

4. A rotary pump for a braking apparatus, comprising:

an outer rotor having an internal tooth portion at an internal periphery thereof;

an inner rotor having an external tooth portion at an external periphery thereof and for performing rotary motion with a drive shaft as an axis;

a rotation portion configured by combining the outer rotor and the inner rotor such that a plurality of chambers are formed between the internal tooth portion and the external tooth portion; and a casing including a central hole into which the drive shaft is fitted, an intake port for intake of brake fluid to the rotation portion, and a discharge port for discharging brake fluid from the rotation portion, this casing housing the rotation portion, wherein brake fluid is intaken by the intake port and brake fluid is discharged by the discharge port due to rotary motion of the rotation portion, while a pressure difference between the intake port and the discharge port is maintained by a first sealed chamber having a largest volume and a second sealed chamber having a smallest volume among the plurality of chambers, the casing is configured to include a first and a second side plate that sandwich the outer rotor and the inner rotor in an axial direction of the drive shaft, at one of the drive shaft axial direction sides of the rotation portion, a gap between end surfaces of the outer rotor and the inner rotor in respective axial directions thereof and an end surface of the first side plate in an axial direction thereof is sealed by a sealing unit provided in the first side plate, at the other drive shaft axial direction side of the rotation portion, a gap between end surfaces of the outer rotor and the inner rotor in the respective axial directions thereof and an end surface of the second side plate in the axial direction thereof is sealed by a mechanical seal resulting from the outer rotor and the inner rotor being pushed against the second side plate by a discharge pressure of brake fluid that acts upon the sealing unit, and a discharge trench communicating with the discharge port is formed in the axial direction end surface of the second side plate to which the mechanical seal is applied;

an intake trench communicating with the intake port that is provided at the axial direction end surface of the second side plate to which the mechanical seal is applied; and a sealing trench portion which is provided in the first side plate and which passes between the discharge port and the drive shaft, passes through the first and the second sealed chambers and extends as far as an outer periphery of the outer rotor, wherein the sealing unit is disposed within the sealing trench portion, and an outer periphery side profile of the intake trench and an inner periphery side profile of the sealing trench portion have the same shape and overlap, when viewed from the axial direction of the drive shaft.

5. A rotary pump for a braking apparatus, comprising:

an outer rotor having an internal tooth portion at an internal periphery thereof;

an inner rotor having an external tooth portion at an external periphery thereof and for performing rotary motion with a drive shaft as an axis;

a rotation portion configured by combining the outer rotor and the inner rotor such that a plurality of chambers are formed between the internal tooth portion and the external tooth portion; and a casing including a central hole into which the drive shaft is fitted, an intake port for intake of brake fluid to the rotation portion, and a discharge port for discharging brake fluid from the rotation portion, this casing housing the rotation portion, wherein brake fluid is intaken by the intake port and brake fluid is discharged by the discharge port due to rotary motion of the rotation portion, while a pressure difference between the intake port and the discharge port is maintained by a first sealed chamber having a largest volume and a second sealed chamber having a smallest volume among the plurality of chambers, the casing is configured to include a first and a second side plate that sandwich the outer rotor and the inner rotor in an axial direction of the drive shaft, at one of the drive shaft axial direction sides of the rotation portion, a gap between end surfaces of the outer rotor and the inner rotor in respective axial directions thereof and an end surface of the first side plate in an axial direction thereof is sealed by a sealing unit provided in the first side plate, at the other drive shaft axial direction side of the rotation portion, a gap between end surfaces of the outer rotor and the inner rotor in the respective axial directions thereof and an end surface of the second side plate in the axial direction thereof is sealed by a mechanical seal resulting from the outer rotor and the inner rotor being pushed against the second side plate by a discharge pressure of brake fluid that acts upon the sealing unit, and a discharge trench communicating with the discharge port is formed in the axial direction end surface of the second side plate to which the mechanical seal is applied;

an intake trench communicating with the intake port that is provided at the axial direction end surface of the second side plate to which the mechanical seal is applied; and a sealing trench portion which is provided in the first side plate and which passes between the discharge port and the drive shaft, passes through the first and the second sealed chambers and extends as far as an outer periphery of the outer rotor, wherein the sealing unit is disposed within the sealing trench portion, and at an area closer to a side of the central hole than the first sealed chamber, an outer periphery side profile of the intake trench is located at a position further to an inner radial direction of the drive shaft than an inner periphery side profile of the sealing trench portion when the intake trench and the sealing trench portion are viewed from the axial direction of the drive shaft.

6. The rotary pump for a braking apparatus according to claim 5, further comprising:

a sealing trench portion which is provided in the first side plate and which passes between the discharge port and the drive shaft, passes through the first and the second sealed chambers and extends as far as an outer periphery of the outer rotor, wherein the sealing unit is disposed within the sealing trench portion, and an outer periphery side profile of the intake trench is located at a position further to an inner radial direction of the driver shaft than an inner periphery side profile of the sealing trench portion when the intake trench and the sealing trench portion are viewed from the axial direction of the drive shaft.

7. The rotary pump for a braking apparatus according to claim 5, further comprising:

a tapered trench which is tapered in accordance with a rotation direction of the rotation portion and which is provided in the axial direction end surface of the second side plate, to which the mechanical seal is applied, in an area that at least one of the outer rotor and the inner rotor passes.

8. The rotary pump for a braking apparatus according to claim 7, wherein the edge portion of the tapered trench is shaped so as to be rounded or tapered.

9. The rotary pump for a braking apparatus according to claim 5, further comprising:

a tapered trench which is tapered in accordance with a reverse rotation direction of the rotation portion and which is provided in at least one of the axial direction end surface of the outer rotor to which the mechanical seal is applied, and the axial direction end surface of the inner rotor to which the mechanical seal is applied.

10. The rotary pump for a braking apparatus according to claim 9, wherein the edge portion of the tapered trench is shaped so as to be rounded or tapered.

11. The rotary pump for a braking apparatus according to claim 5, wherein the sealing unit includes a first seal member which is made from an elastic body and which is disposed at a bottom side of the sealing trench portion, and a second seal member disposed closer to an opening hole side of the sealing trench portion than the first seal member, the second seal member being in contact with the inner rotor and the outer rotor due to elastic force of the first seal member, a stepped portion is formed in the sealing trench portion such that an inner periphery side of the first seal member is positioned further to an outer radial direction of the drive shaft than an inner periphery side of the second seal member, when the first seal member and the second seal member are viewed from the axial direction of the drive shaft, and at the other drive shaft axial direction side of the rotation portion, the gap between the end surfaces of the outer rotor and the inner rotor in respective axial directions thereof and the end surface of the second side plate in the axial direction thereof is sealed by the mechanical seal resulting from the outer rotor and the inner rotor being pushed against the second side plate by the discharge pressure of brake fluid that acts upon the sealing unit.

12. The rotary pump for a braking apparatus according to claim 5, wherein an edge portion of the intake trench is shaped so as to be rounded or tapered.

13. A rotary pump for a braking apparatus, comprising:

an outer rotor having an internal tooth portion at an internal periphery thereof;

an inner rotor having an external tooth portion at an external periphery thereof and for performing rotary motion with a drive shaft as an axis;

a rotation portion configured by combining the outer rotor and the inner rotor such that a plurality of chambers are formed between the internal tooth portion and the external tooth portion; and a casing including a central hole into which the drive shaft is fitted, an intake port for intake of brake fluid to the rotation portion, and a discharge port for discharging brake fluid from the rotation portion, this casing housing the rotation portion, wherein brake fluid is intaken by the intake port and brake fluid is discharged by the discharge port due to rotary motion of the rotation portion, while a pressure difference between the intake port and the discharge port is maintained by a first sealed chamber having a largest volume and a second sealed chamber having a smallest volume among the plurality of chambers, the casing is configured to include a first and a second side plate that sandwich the outer rotor and the inner rotor in an axial direction of the drive shaft, at one of the drive shaft axial direction sides of the rotation portion, a gap between end surfaces of the outer rotor and the inner rotor in respective axial directions thereof and an end surface of the first side plate in an axial direction thereof is sealed by a sealing unit provided in the first side plate, at the other drive shaft axial direction side of the rotation portion, a gap between end surfaces of the outer rotor and the inner rotor in the respective axial directions thereof and an end surface of the second side plate in the axial direction thereof is sealed by a mechanical seal resulting from the outer rotor and the inner rotor being pushed against the second side plate by a discharge pressure of brake fluid that acts upon the sealing unit, and a discharge trench communicating with the discharge port is formed in the axial direction end surface of the second side plate to which the mechanical seal is applied;

an intake trench communicating with the intake port that is provided at the axial direction end surface of the second side plate to which the mechanical seal is applied; and a sealing wench portion which is provided in the first side plate and which passes between the discharge port and the drive shaft, passes through the first and the second sealed chambers and extends as far as an outer periphery of the outer rotor, wherein the sealing unit is disposed within the sealing trench portion, and at an area closer to a side of the central hole than the second sealed chamber, an outer periphery side profile of the intake trench is located at a position further to an inner radial direction of the drive shaft than an inner periphery side profile of the sealing trench portion when the intake trench and the sealing trench portion are viewed from the axial direction of the drive shaft.

14. The rotary pump for a braking apparatus according to claim 13, further comprising:

a sealing trench portion which is provided in the first side plate and which passes between the discharge port and the drive shaft, passes through the first and the second sealed chambers and extends as far as an outer periphery of the outer rotor, wherein the sealing unit is disposed within the sealing Wench portion, and an outer periphery side profile of the intake trench is located at a position further to an inner radial direction of the driver shaft than an inner periphery side profile of the sealing trench portion when the intake trench and the sealing trench portion are viewed from the axial direction of the drive shaft.

15. The rotary pump for a braking apparatus according to claim 13, further comprising:

a tapered trench which is tapered in accordance with a rotation direction of the rotation portion and which is provided in the axial direction end surface of the second side plate, to which the mechanical seal is applied, in an area that at least one of the outer rotor and the inner rotor passes.

16. The rotary pump for a braking apparatus according to claim 15, wherein the edge portion of the tapered trench is shaped so as to be rounded or tapered.

17. The rotary pump for a braking apparatus according to claim 13, further comprising:

a tapered trench which is tapered in accordance with a reverse rotation direction of the rotation portion and which is provided in at least one of the axial direction end surface of the outer rotor to which the mechanical seal is applied, and the axial direction end surface of the inner rotor to which the mechanical seal is applied.

18. The rotary pump for a braking apparatus according to claim 17, wherein the edge portion of the tapered trench is shaped so as to be rounded or tapered.

19. The rotary pump for a braking apparatus according to claim 13, wherein the sealing unit includes a first seal member which is made from an elastic body and which is disposed at a bottom side of the sealing trench portion, and a second seal member disposed closer to an opening hole side of the sealing trench portion than the first seal member, the second seal member being in contact with the inner rotor and the outer rotor due to elastic force of the first seal member, a stepped portion is formed in the sealing trench portion such that an inner periphery side of the first seal member is positioned further to an outer radial direction of the drive shaft than an inner periphery side of the second seal member, when the first seal member and the second seal member are viewed from the axial direction of the drive shaft, and at the other drive shaft axial direction side of the rotation portion, the gap between the end surfaces of the outer rotor and the inner rotor in respective axial directions thereof and the end surface of the second side plate in the axial direction thereof is sealed by the mechanical seal resulting from the outer rotor and the inner rotor being pushed against the second side plate by the discharge pressure of brake fluid that acts upon the sealing unit.

20. The rotary pump for a braking apparatus according to claim 13, wherein an edge portion of the intake trench is shaped so as to be rounded or tapered.

* * * * *